(12) United States Patent
Takenaka et al.

(10) Patent No.: US 7,980,113 B2
(45) Date of Patent: Jul. 19, 2011

(54) ONBOARD ELECTRONIC DEVICE OPERATING UNIT

(75) Inventors: Kenichi Takenaka, Handa (JP); Manabu Ushida, Anjo (JP)

(73) Assignee: Denso Corporation, Kariya (JP)

( * ) Notice: Subject to any disclaimer, the term of this patent is extended or adjusted under 35 U.S.C. 154(b) by 563 days.

(21) Appl. No.: 12/198,494

(22) Filed: Aug. 26, 2008

(65) Prior Publication Data
US 2009/0071393 A1    Mar. 19, 2009

(30) Foreign Application Priority Data
Sep. 18, 2007    (JP) ................... 2007-241448

(51) Int. Cl.
*G01M 17/00* (2006.01)
(52) U.S. Cl. ........................................................ 73/1.01
(58) Field of Classification Search .............. 73/1.01; 116/62.1; 340/438, 439, 441
See application file for complete search history.

(56) References Cited

U.S. PATENT DOCUMENTS

| 7,263,870 | B2* | 9/2007 | Avitia et al. ............... 73/1.01 |
| 2006/0145888 | A1 | 7/2006 | Aoki | |
| 2007/0044535 | A1* | 3/2007 | Avitia et al. ............... 73/1.41 |
| 2008/0264079 | A1* | 10/2008 | Takenaka et al. .......... 62/127 |
| 2009/0112451 | A1* | 4/2009 | Justice ........................ 701/115 |

FOREIGN PATENT DOCUMENTS

| JP | 07-021432 | 1/1995 |
| JP | 2002-139354 | 5/2002 |

OTHER PUBLICATIONS

Japanese Office Action dated Sep. 17, 2009, issued in corresponding Japanese Application No. 2007-241448, with English translation.

* cited by examiner

*Primary Examiner* — Eric S. McCall
(74) *Attorney, Agent, or Firm* — Nixon & Vanderhye PC

(57) ABSTRACT

An onboard electronic device operating unit enables a needle calibration mode by performing a specified needle calibration enabling operation on part of multiple setup operation sections. The setup operation sections can change setting states of control contents for an onboard electronic device. In the needle calibration mode, part of the setup operation sections functions as a needle calibration section. Operating the needle calibration section can calibrate a needle position of a needle-type display apparatus.

30 Claims, 8 Drawing Sheets

ONBOARD ELECTRONIC DEVICE OPERATING UNIT

CROSS REFERENCE TO RELATED APPLICATION

This application is based on and incorporates herein by reference Japanese Patent Application No. 2007-241448 filed on Sep. 18, 2007.

FIELD OF THE INVENTION

The invention relates to an onboard electronic device operating unit.

BACKGROUND OF THE INVENTION

An electronic device is mounted on a vehicle such as a car. For example, an instrument panel of the vehicle is provided with an operation unit for operating the electronic device such as an air conditioning system, a car audio system, and a car navigation system. The operation unit includes various operation sections so that a passenger of the vehicle can configure settings for controlling the device to use various functions of the onboard electronic device.

A display apparatus corresponding to the operation unit displays current setting states of various control contents configured on various operation sections of the operation unit. There is disclosed a needle-type display apparatus that, displays the states using a dial and a needle moving over the dial (Patent Document 1). The dial has a scale so as to be able to directly read the current setting state of the control content.

A conventional operation unit having a needle-type display apparatus may cause the needle to slightly deviate from the scale from any cause. A user may complain about inconvenience of visibility. When mounted on a vehicle, the conventional operation unit has no means for adjusting needle positions. There has been no solution to the complaint but to replace the product.

Patent Document 1: JP-2006-168567 A

SUMMARY OF THE INVENTION

It is an object of the present invention to provide an onboard electronic device operating unit capable of adjusting needle positions while the unit is mounted on a vehicle.

According to an example of the present invention, an onboard electronic device operating unit is provided as follows. A plurality of setup operation sections are configured to change setting states of control contents for an onboard electronic device. A current setting state acquisition means is configured to acquire a current setting state of the control contents. A needle-type display apparatus is configured to have a dial, a needle rotatably provided over the dial, and a needle driving motor for performing incremental rotation of the needle, wherein the dial has a scale so as to be capable of directly reading the current setting state of a predetermined control content for needle display out of the control contents. A needle calibration section is configured to calibrate a start position for the incremental rotation of the needle over the dial in units of the scale. A mode change operation section is configured to change between a normal control mode and a needle calibration mode as an operation control mode for the needle, the normal control mode controlling the needle driving motor so as to move the needle over the dial in accordance with the acquired current setting state of the control content for needle display, the needle calibration mode controlling the needle driving motor so as to move the needle over the dial in accordance with an operation on the needle calibration section. A mode setup means is configured to set the operation control mode based on an operation state of the mode change operation section. A needle operation control means is configured to control the needle driving motor in accordance with the operation control mode so as to move the needle over the dial.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings.

Figure 1:
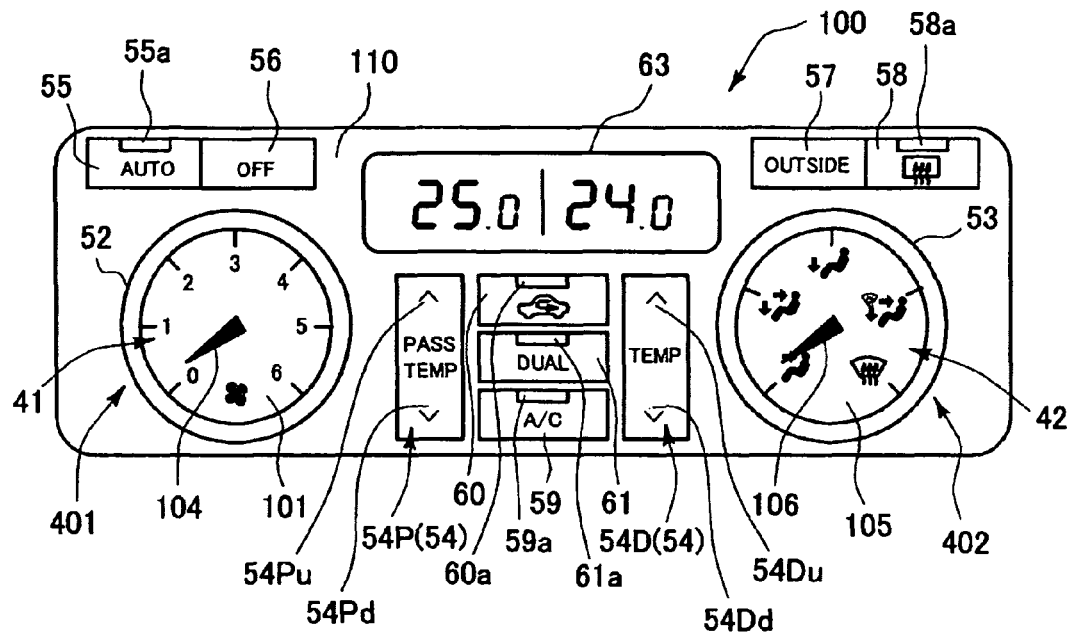
FIG. 1 is a front view of an onboard air conditioner operation unit according to an embodiment of the invention.

FIG. 1 exemplifies a front view of an onboard air conditioner operation unit as an onboard electronic device operating unit according to an embodiment of the present invention. An onboard air conditioner operation unit 100 is provided in a vehicle and independently controls air flow of unshown air conditioner outlets for the driver's and passenger's seats. Both outlets are provided on an instrument panel of the vehicle. There are provided rocker switches, that is, a driver's seat temperature setting switch 54D and a passenger seat temperature setting switch 54P right and left on a chassis panel 110 in a vehicle compartment. The rocker switches 54D and 54P provide bidirectional operation sections. Forward operation sections 54Du and 54Pu increase air temperature values for the corresponding seats. Reverse operation sections 54Dd and 54Pd decrease the same. The operation sections 54Du and 54Dd or 54Pu and 54Pd are provided at different positions.

Figure 3:
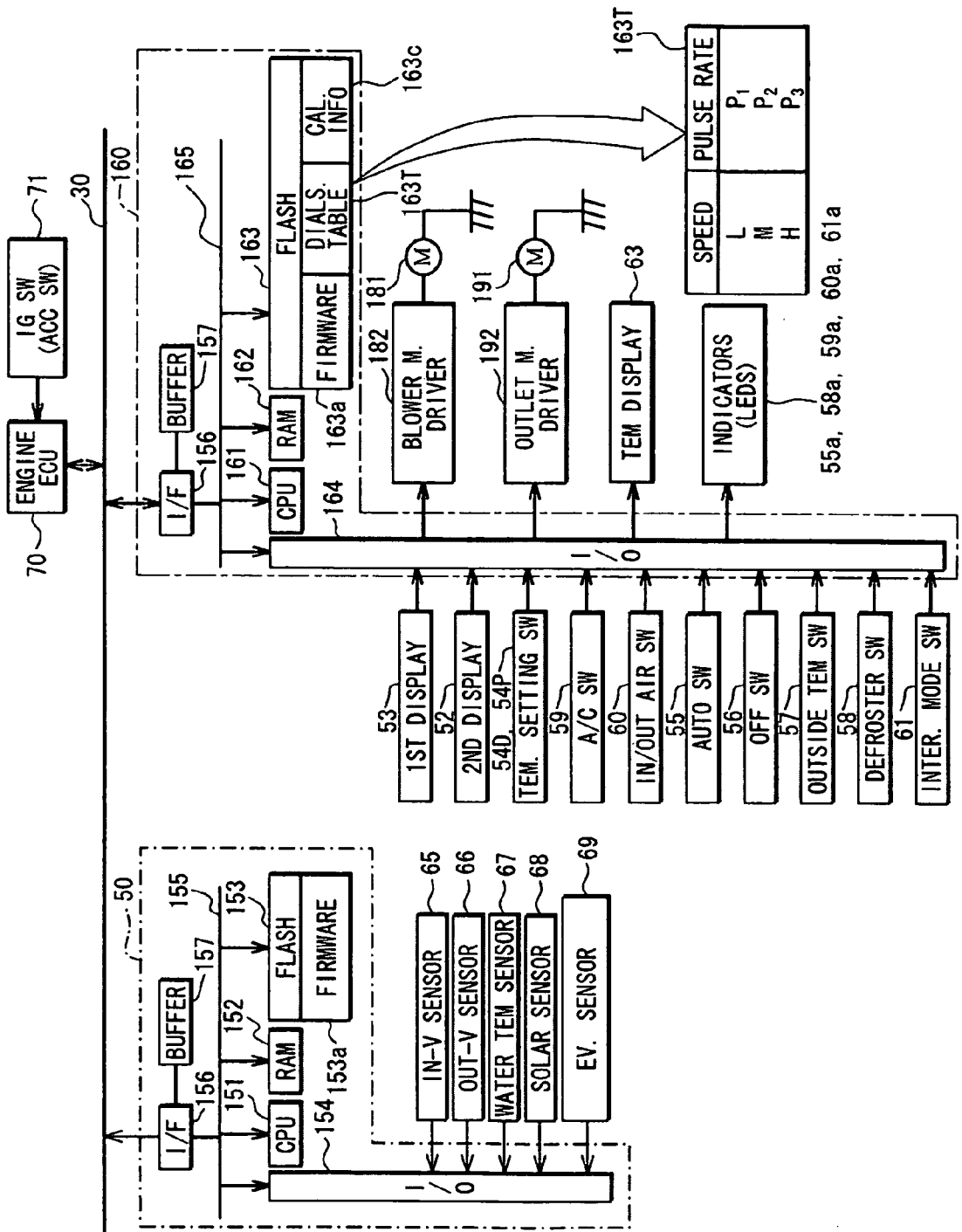
FIG. 3 is a block diagram showing main parts of FIG. 2.

A first display apparatus 41 and a second display apparatus 42 are provided as needle-type display apparatuses right and left on the chassis panel 110 in the vehicle compartment. The first display apparatus 41 displays a currently configured outlet air volume as a control parameter. The second display apparatus 42 displays a currently configured outlet type as a control parameter. The first display apparatus 41 includes a dial 101, a needle 104, and a needle driving motor 181 (FIG. 3). The dial 101 has a scale so as to be able to directly read a currently configured outlet air volume. The needle 104 is provided so as to be rotated over the dial 101. The needle driving motor 181 rotates the needle 104. The second display apparatus 42 has a dial 105, a needle 106, and a needle driving motor 191 (FIG. 3). The dial 105 has a scale so as to be able to directly read a currently configured outlet type. The needle 106 is provided so as to be rotated over the dial 105. The needle driving motor 191 rotates the needle 106. According to the embodiment, the needles 104 and 106 are rotatably provided over the dials 101 and 105. The dials 101 and 105 have scales so as to be able to directly read currently configured setting states equivalent to control contents indicated by the needles. The setting states signify various control parameters for the onboard air conditioner such as a currently configured outlet air volume and a currently configured outlet type. The needle driving motors 181 and 191 stepwise rotate the needles 104 and 106.

Scale graphics such as an air volume value and an outlet icon are printed on the dials 101 and 105. The display apparatuses 41 and 42 are circular. Outside peripheries of the display apparatuses 41 and 42 are provided with rotatable dial-type air volume switch (air volume input section) 52 and dial-type outlet selection switch (outlet input section) 53, respectively. The display apparatuses 41 and 42 are constructed as units (dial operation sections) 401 and 402 provided with cylindrical dial switches (rotary operation sections) 52 and 53 around the outside peripheries. The dial switches (rotary operation sections) 52 and 53 are cylindrically provided so as to be bidirectionally rotatable around predetermined axes. Even when the dial switches 52 and 53 are rotated, the first display apparatus 41 and the second display apparatus 42 do not rotate.

The chassis panel 110 includes a setup temperature display section 63, an outdoor temperature display switch 57, an interlock mode selection switch 61, an automatic switch 55, an A/C (Air Conditioner) switch 59, an OFF switch 56, a rear defroster selection switch 58, and an in/out-vehicle air switch 60. The setup temperature display section 63 uses a liquid crystal display to display values entered from the right and left temperature setting switches 54D and 54P. The outdoor temperature display switch 57 displays the outdoor temperature on the setup temperature display section 63. The interlock mode selection switch 61 has an LED indicator 61a that lights when interlock mode is enabled for both temperature switches 54D and 54P. The automatic switch 55 includes an LED indicator 55a that lights when automatic mode is enabled. The A/C switch 59 turns on the air conditioner and includes an LED indicator 59a that lights when the air conditioner is turned on. The OFF switch 56 turns off the air conditioner. The rear defroster selection switch 58 has an LED indicator 58a that lights when a rear defroster is turned on. The in/out-vehicle air switch 60 has an LED indicator 60a that lights when the in-vehicle air is selected.

The switches 52 through 61 on the chassis panel (air conditioner panel) 110 are equivalent to setup operation sections according to the embodiment. In a normal control mode (to be described), the respective setup operation sections are capable of changing setting states of the corresponding control contents such as control parameters for the onboard air conditioner.

Figure 2:
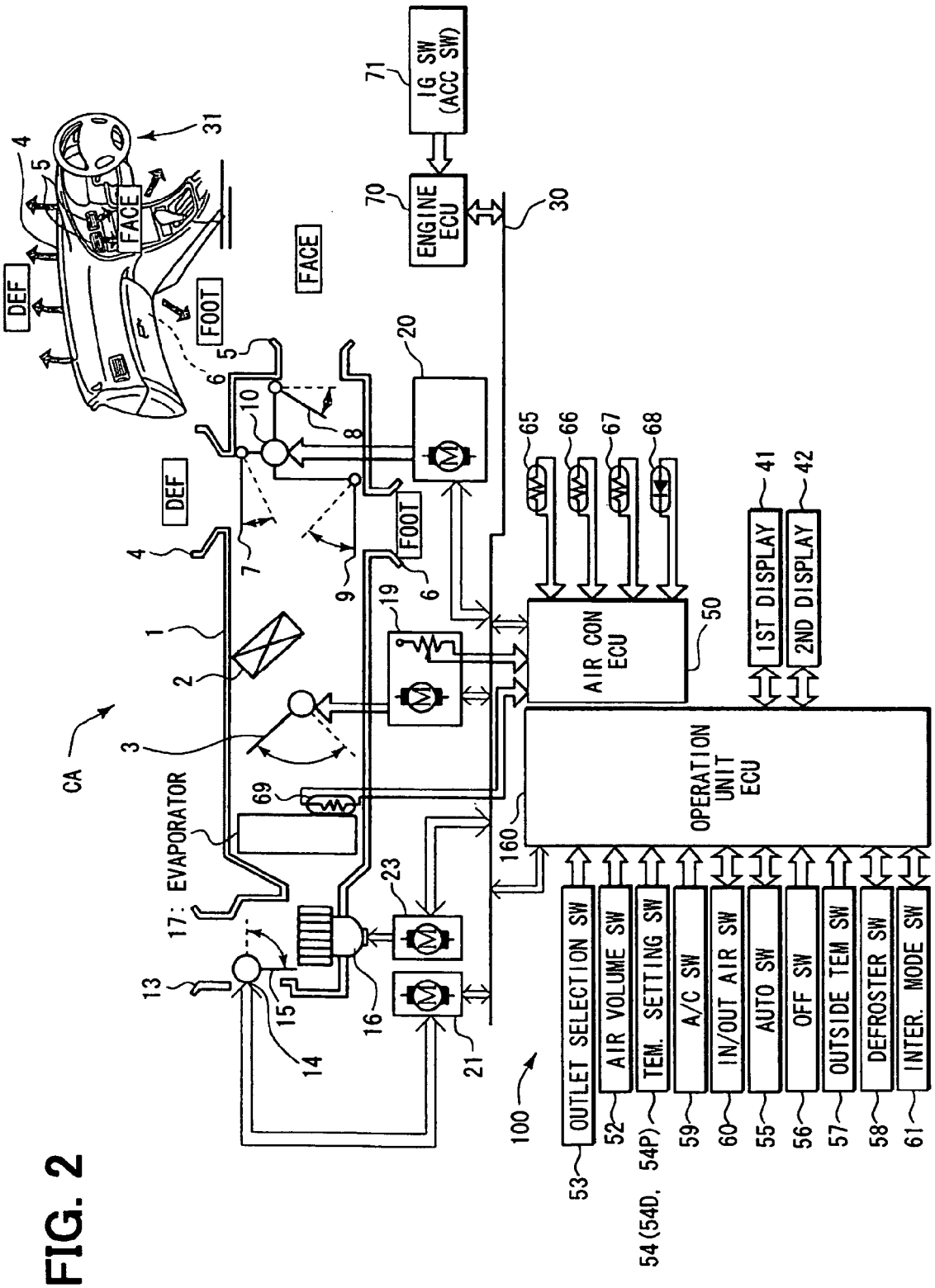
FIG. 2 is a block diagram showing an overall construction of an onboard air conditioner controller.

FIG. 2 schematically shows an overall construction of an air conditioner controller CA. The air conditioner controller CA has a duct 1. The duct 1 is provided with an in-vehicle air suction opening 13 and an out-vehicle air suction opening 14. The in-vehicle air suction opening 13 circulates air in the vehicle. The out-vehicle air suction opening 14 takes in air from outside the vehicle. An in/out-vehicle air change damper 15 selects either air suction opening. A blower motor 23 drives a blower 16. The blower 16 introduces air from the in-vehicle air suction opening 13 or the out-vehicle air suction opening 14 into the duct 1.

An evaporator 17 and a heater core 2 are provided inside the duct 1. The evaporator 17 cools down the ducted air to generate cool air. The heater core 2 heats the air to generate warm air using waste heat from engine cooling water. The cool air and the warm air are mixed at a ratio corresponding to an angle of an air mix damper 3. The outlets 4, 5, and 6 exhaust the mixed air. The defroster outlet 4 defogs a windshield and is located at the top of the instrument panel corresponding to an inside bottom edge of the windshield. The face outlet 5 is located at the center of the instrument panel. The foot outlet 6 is located at the bottom of the instrument panel toward passenger feet. Outlet change dampers 7, 8, and 9 open and close the outlets independently. Specifically, a damper drive gear mechanism 10 operates the outlets as follows in accordance with a damper rotation control phase supplied from a motor 20. Only the defroster outlet 4 opens. Only the face outlet 5 opens. Only the foot outlet 6 opens. The face outlet 5 and the defroster outlet 4 open. The foot outlet 6 and the defroster outlet 4 open. All the face outlet 5, the defroster outlet 4, and the foot outlet 6 open.

A motor 21 electrically drives the in/out-vehicle air change damper 15. A motor 19 electrically drives the air mix damper 3. A motor 20 electrically drives the outlet change dampers 7, 8, and 9. For example, stepping motors are used for the motors 19, 20, and 21. An air conditioner ECU 50 centrally controls operations of the motors. The air conditioner ECU 50 is a major part of an air conditioner drive control means. The blower motor 23 adjusts an outlet air volume under PWM control of revolution speeds. A brushless motor may be used for the blower motor 23. As shown in FIG. 3, the air conditioner ECU 50 is computer hardware including a CPU 151, RAM 152, flash memory 153, and an input/output section 154 interconnected by an internal bus 155. The flash memory 153 stores air conditioner control firmware 153a. The input/output section 154 connects with an evaporator sensor 69, an in-vehicle air sensor 65, an out-vehicle air sensor 66, a water temperature sensor 67, and a solar sensor 68.

As shown in FIG. 2, the onboard air conditioner operation unit 100 also has an independent operation unit ECU 160 that connects with an air volume switch 52, an outlet selection switch 53, temperature setting switches 54D and 54P, the A/C switch 59, the automatic switch 55, the in/out-vehicle air switch 60, the first display apparatus 41, and the second display apparatus 42 as mentioned above. As shown in FIG. 3, the operation unit ECU 160 and the air conditioner ECU 50 each use a serial communication interface 156 so as to be connected to each other through a serial communication such as LIN communication serial bus, for example. The serial communication interface 156 includes a communication buffer 157.

The communication bus 30 also connects with an engine ECU 70. The engine ECU 70 controls an engine of the vehicle equipped with the onboard air conditioner operation unit 100. The engine ECU 70 connects with an ignition switch 71 for powering the ignition and accessory. The ignition switch 71 is provided around a steering wheel 31 in FIG. 2 so that a driver sitting on a driver's seat can operate the ignition switch 71. The ignition switch 71 also belongs to the setup operation section according to the embodiment.

The operation unit ECU 160 is also computer hardware including a CPU 161, RAM 162, flash memory 163, a dial speed table 163T, and an input/output section 164 interconnected by an internal bus 165. The flash memory 163 stores motor control firmware 163a for driving the needle. The input/output section 164 connects with the air volume switch 52, the outlet selection switch 53, the temperature setting switches 54D and 54P, the A/C switch 59, the automatic switch 55, the in/out-vehicle air switch 60, the OFF switch 56, the rear defroster selection switch 58, the interlock mode selection switch 61, the first display apparatus 41, and the second display apparatus 42 mentioned above. The input/output section 164 also connects with the LED indicators 55a, 58a, 59a, 60a, and 61a, and the setup temperature display section 63. According to the embodiment, stepping motors are used for the needle driving motors 181 and 191 corresponding to the first display apparatus 41 and the second display apparatus 42, respectively. The needle driving motors 181 and 191 are connected to the input/output section 164 via motor drivers 182 and 192.

The motor drivers 182 and 192 each include a known logic sequencer and a drive pulse control section. The logic sequencer receives a forward or backward drive pulse and excites to drive the stepping motor 181 or 191 in the corresponding direction. The drive pulse control section uses a microcomputer or a dedicated logic and includes a drive pulse counter. The drive pulse control section compares a current motor angle position indicated by the drive pulse counter with an angle value specified from the operation unit ECU 160. The drive pulse control section outputs a forward or reverse drive pulse signal to the logic sequencer. The drive pulse signal is needed to rotate the motor from the current rotation angle to the specified angle. When a drive pulse is supplied to the logic sequencer, the needle of the needle-type display apparatus 41 rotates so as to use the specified angle as a target position. When no drive pulse is generated, the needle position is unchanged.

The operation unit ECU 160 transmits operation states of the air volume switch 52, the outlet selection switch 53, the rear defroster selection switch 58, the temperature setting switches 54 (54D and 54P), the A/C switch 59, the OFF switch 56, the automatic switch 55, the interlock mode selection switch 61, and the in/out-vehicle air switch 60 to the air conditioner ECU 50 via the communication bus 30.

Along with the operation unit ECU 160, the air conditioner ECU 50 provides the following control by executing the air conditioner control firmware 153a.

The air conditioner ECU 50 issues a control instruction to a drive IC of the corresponding motor 21 so that the in/out-vehicle air change damper 15 moves toward the in/out-vehicle side in accordance with an operation state of the in/out-vehicle air switch 60.

The air conditioner ECU 50 turns on or off the evaporator 17 in accordance with an operation state of the A/C switch 59.

The air conditioner ECU 50 switches the air conditioner operation mode between manual mode and automatic mode in accordance with an operation state of the automatic switch 55.

In the automatic mode, the air conditioner ECU 50 references information about temperature settings input from the temperature setting switches 54D and 54P and information output from the in-vehicle air sensor 65, the out-vehicle air sensor 66, the water temperature sensor 67, and the solar sensor 68. The air conditioner ECU 50 follows a known sequence so that the in-vehicle temperature approximates to a specified temperature. The air conditioner ECU 50 controls operations of the corresponding motors 19, 23, and 20 to adjust the outlet temperature by adjusting the opening of the air mix damper 3, adjust the air volume of the blower motor 23, and change positions of the outlet change dampers 7, 8, and 9.

In the manual mode, the air conditioner ECU 50 adjusts the air volume of the blower motor 23 in accordance with operation states of the air volume switch 52 and the outlet selection switch 53. In addition, the air conditioner ECU 50 controls driving of the motor 20 so that the outlet change dampers 7, 8, and 9 can provide the corresponding open or close state.

The air conditioner ECU 50 issues the above-mentioned control parameter values indicating air conditioner operation states such as the specified air volume and the selected outlet state. The control parameter values are assumed to be control values settled in the air conditioner ECU 50 and are transmitted to the operation unit ECU 160 via the communication bus 30. The air conditioner ECU 50 also transmits the information indicating the setting state of the automatic or manual operation mode to the operation unit ECU 160 via the communication bus 30. Based on the information received from the air conditioner ECU 50, the operation unit ECU 160 drives the needle 104 of the first display apparatus 41 and the needle 106 of the second display apparatus 42 using the corresponding motors 181 and 191. The needle 104 indicates the specified air volume. The needle 106 indicates the selected outlet state. The air conditioner ECU 50 functions as an air conditioner state identification means or, more specifically, a means for determining whether the onboard air conditioner operates in the manual or automatic mode. The operation unit ECU 160 together with the motor drivers 182 and 192 functions as a needle operation control means.

The air conditioner ECU 50 issues the above-mentioned control parameter values indicating air conditioner operation states such as the specified air volume and the selected outlet state. The control parameter values are assumed to be control values settled in the air conditioner ECU 50 and are transmitted to the operation unit ECU 160 via the communication bus 30. The air conditioner ECU 50 also transmits the information indicating the setting state of the automatic or manual operation mode to the operation unit ECU 160 via the communication bus 30. Based on the information received from the air conditioner ECU 50, the operation unit ECU 160 drives the needle 104 of the first display apparatus 41 and the needle 106 of the second display apparatus 42 using the corresponding motors 181 and 191. The needle 104 indicates the specified air volume. The needle 106 indicates the selected outlet state. The air conditioner ECU 50 functions as an air conditioner state identification means or, more specifically, a means for determining whether the onboard air conditioner operates in the manual or automatic mode. The operation unit ECU 160 together with the motor drivers 182 and 192 functions as a needle operation control means.

Figure 4:
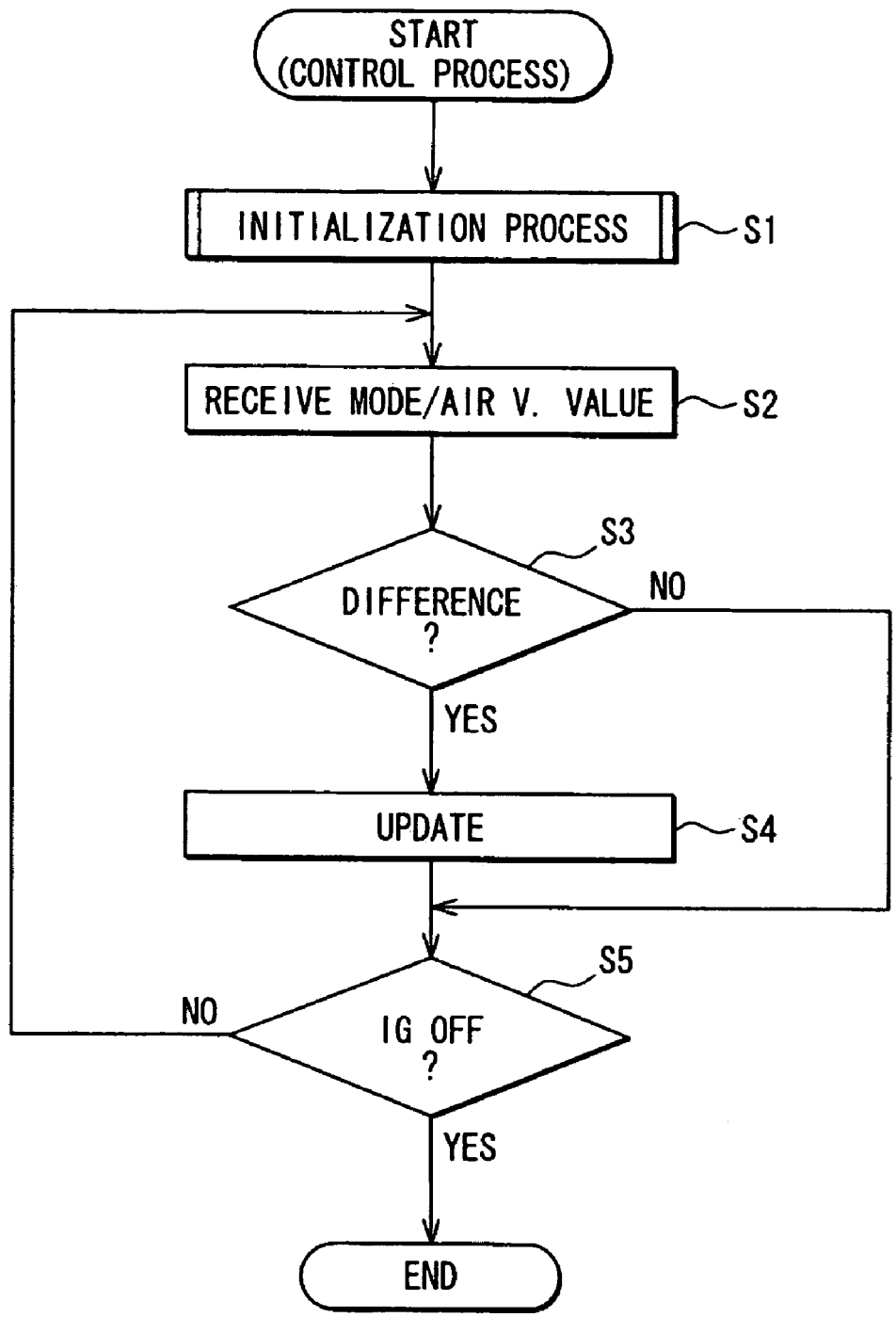
FIG. 4 is a flow chart exemplifying a control process of the onboard air conditioner operation unit.

With reference to a flow chart in FIG. 4, the following describes an operational process of the first display apparatus 41 that indicates a settled air volume value. When the system starts, an initialization process is performed at S1. The system starts when the ignition switch 71 is operated to turn on the accessory or ignition power. According to the embodiment, the ignition power is turned on. During the initialization process, the operation unit ECU 160 according to the embodiment can calibrate the position of the needle 101 of the needle-type display apparatus 41. The motor 181 provided as a stepping motor drives the needle 101. More specifically, a needle calibration enabling operation is performed during the initialization process to enable needle calibration mode, making it possible to fine-adjust the needle position. The needle position calibration will be described later.

At S2, the air conditioner ECU 50 receives an operation state of the automatic switch 55 from the operation unit ECU 160 to enable the corresponding mode. When the air volume switch 52 is operated during automatic mode setting, the operation state of the air volume switch 52 is transmitted to the air conditioner ECU 50 for mode setting so that the manual mode is automatically enabled even though the automatic switch 55 is not operated. The air conditioner ECU 50 transmits the settled automatic or manual mode along with the target air volume to be indicated by the needle to the operation unit ECU 160.

In the manual mode, the air conditioner ECU 50 starts driving the blower motor 23 based on the specified air volume and transmits the settled air volume value to the operation unit ECU 160. In the automatic mode, the air conditioner ECU 50 periodically transmits a specified air volume value to the operation unit ECU 160. The air volume value is automatically configured or changed under automatic air conditioner control provided by the air conditioner control firmware 153a.

At S2, the operation unit ECU 160 receives the above-mentioned mode information and air volume value. To drive the needle 104, the RAM 162 stores a specified angle with reference to the currently effective air volume value, that is, a current air volume value. The specified angle is input to the motor driver 182. The motor driver 182 compares the input specified angle with the current angle indicated by the drive pulse counter. When a difference is found between both, the motor driver 182 calculates a motor drive direction and the number of pulses needed to cancel the difference. Base on a calculation result, the motor driver 182 drives the stepping motor 41 in a forward or backward direction using the specified angle as a target position.

At S3, the process compares the current air volume value with the received value. When the values differ from each other, the process proceeds to S4 to update or change the current value to the received value. When the values are equal to each other, the process skips S4 and makes no change. S2 through S4 are repeated until an operation to stop the process is performed at S5 such as operating the ignition switch 71 to turn off the ignition power.

The air volume switch 52 is provided as a dial operation section. The air volume switch 52 is capable of stepwise changing a specified air volume value as a control parameter in increments of a predetermined angle in accordance with a pulse supplied from an unshown pulse switch. The embodiment allows values to be changed stepwise at seven grades 0 through 6 on a scale basis. In FIG. 2, the air conditioner ECU 50 sequentially acquires specified air volume values from the operation unit ECU 160. The air volume switch 52 is used to stepwise change and enter air volume values.

While there have been described the operations of the first display apparatus 41 for setting air volumes, the same process can be applied to the second display apparatus 42 to provide control over setting the outlet and displaying the setting content. In this case, it may be preferable to replace the air volume with the outlet and replace the reference numerals with those equivalent to the second display apparatus 42 in the above-mentioned description.

According to the above-mentioned air conditioner controller CA, the operation unit ECU 160 controls operational input and display output and the air conditioner ECU 50 controls air conditioner operations. On the other hand, one ECU may be used to provide overall control. This eliminates the need for all communication processes between the ECUs 50 and 160 via the communication bus 30 according to the above-mentioned embodiment.

The needles 104 and 106 of the first display apparatus 41 and the second display apparatus 42 incrementally rotate on a scale basis. A position to start the incremental rotation (also referred to as stepwise rotation) may deviate from the scale. To solve this problem, the onboard air conditioner operation unit 100 according to the embodiment can calibrate positions of the needles 104 and 106 of the first display apparatus 41 and the second display apparatus 42 during the initialization process at S1 in FIG. 4

Specifically, operation control modes for the needles 104 and 106 include normal control mode and needle calibration mode. The normal control mode controls the needle driving motors 181 and 191 so that the needles 104 and 106 move over the dials 101 and 105 in accordance with the current setting states of the needle indication acquired from the operation unit ECU 160. The needle calibration mode controls the needle driving motors 181 and 191 so that the needles 104 and 106 move over the dials 101 and 105 in accordance with operations on needle calibration sections corresponding to the needles 104 and 106. A mode change operation section is provided to switch between both modes. The system enables one of the two operation control modes based on an operation on the mode change operation section. The mode change operation section includes a needle calibration enabling section and a needle calibration disabling section. The needle calibration enabling section enables the needle calibration mode. The needle calibration disabling section disables the needle calibration mode and enables the normal control mode.

The needle calibration enabling section is included in one or more predetermined setup operation sections 52 through 61 and 71. According to the embodiment, the needle calibration enabling section is included in the ignition switch 71, the rear defroster selection switch 58, and the A/C switch 59. Simultaneously operating the switches 71, 58, and 59 initiates the needle calibration enabling operation that uses these switches to enable the needle calibration mode. Specifically, the needle calibration mode is enabled when the ignition switch 71 is operated to turn on the accessory or ignition power while the rear defroster selection switch 58 and the A/C switch 59 are pressed simultaneously. According to the embodiment, the ignition power is turned on. The needle calibration enabling operations using the needle calibration enabling sections 71, 58, and 59 differ from normal operations for enabling the normal control mode, that is, operations for changing setting states of the control contents assigned to the switches in the normal control mode. The reason is to prevent the needle calibration mode from being enabled inadvertently when the ignition switch 71 is turned on. In addition, the needle calibration enabling operations are designed to require greater difficulty than the normal operations so as not to easily enable the needle calibration mode.

In the needle calibration mode, an input operation on the predetermined needle calibration section can calibrate needle positions of the first display apparatus 41 and the second display apparatus 42. Specifically, it is possible to calibrate the position to start incrementally rotating the needles 104 and 106 corresponding to the scale on the dials 101 and 105. The needle calibration section is also included in any of the setup operation sections 52 through 61 and 71. According to the embodiment, the calibration operation section 54P is used as the needle calibration section for the display apparatus 41 at the passenger seat. The calibration operation section 54D is used as the needle calibration section for the display apparatus 42 at the driver's seat. The setup operation sections 54D and 54P as the needle calibration sections are rocker switches or rocking-type press operation sections. The setup operation sections 54D and 54P each include forward operation sections 54Du and 54Pu and reverse operation sections 54Dd and 54Pd. The setup operation sections 54D includes the forward operation section 54Du and the reverse operation section 54Dd that are positioned vertically. The setup operation sections 54P includes the forward operation section 54Pu and the reverse operation section 54Pd that are positioned vertically. The forward operation sections 54Du and 54Pu increase the assigned control parameter values. The reverse operation sections 54Dd and 54Pd decrease the same.

According to the embodiment, the chassis panel 110 is provided with two needle-type display apparatuses and two rocker switches. One needle-type display apparatus corresponds to one rocker switch as the needle calibration section. The other needle-type display apparatus corresponds to the other rocker switch as the needle calibration section. The two needle-type display apparatuses are divided into the right driver's seat side and the left passenger seat side on the chassis panel 110. The two rocker switches are also divided into the right driver's seat side and the left passenger seat side on the chassis panel 110. The needle-type display apparatus at the right driver's seat side corresponds to the rocker switch. The needle-type display apparatus at the left passenger seat side corresponds to the rocker switch. The chassis panel 110 may be provided with two or more needle-type display apparatuses and rocker switches so that the number of needle-type display apparatuses is equal to that of rocker switches. The driver's seat and the passenger seat may be reversed.

The needle calibration disabling section can be also included in one or more setup operation sections 52 through 61 and 71. The needle calibration disabling section is included in a setup operation section different from the needle calibration enabling sections 71, 58, and 59. The needle calibration disabling section is included in one of the setup operation sections 52 through 61 and 71, not two or more of the same. According to the embodiment, the OFF switch 56 is used as the needle calibration disabling section. In other words, the setup operation section 56 functions as the needle calibration disabling section. An operation on the setup operation section 56 for disabling the needle calibration is predetermined as an operation to switch to the normal control mode. The needle calibration disabling operation is the same as the normal operation in the normal control mode for changing the setting state of the control content assigned to the setup operation section 56.

Figure 5:
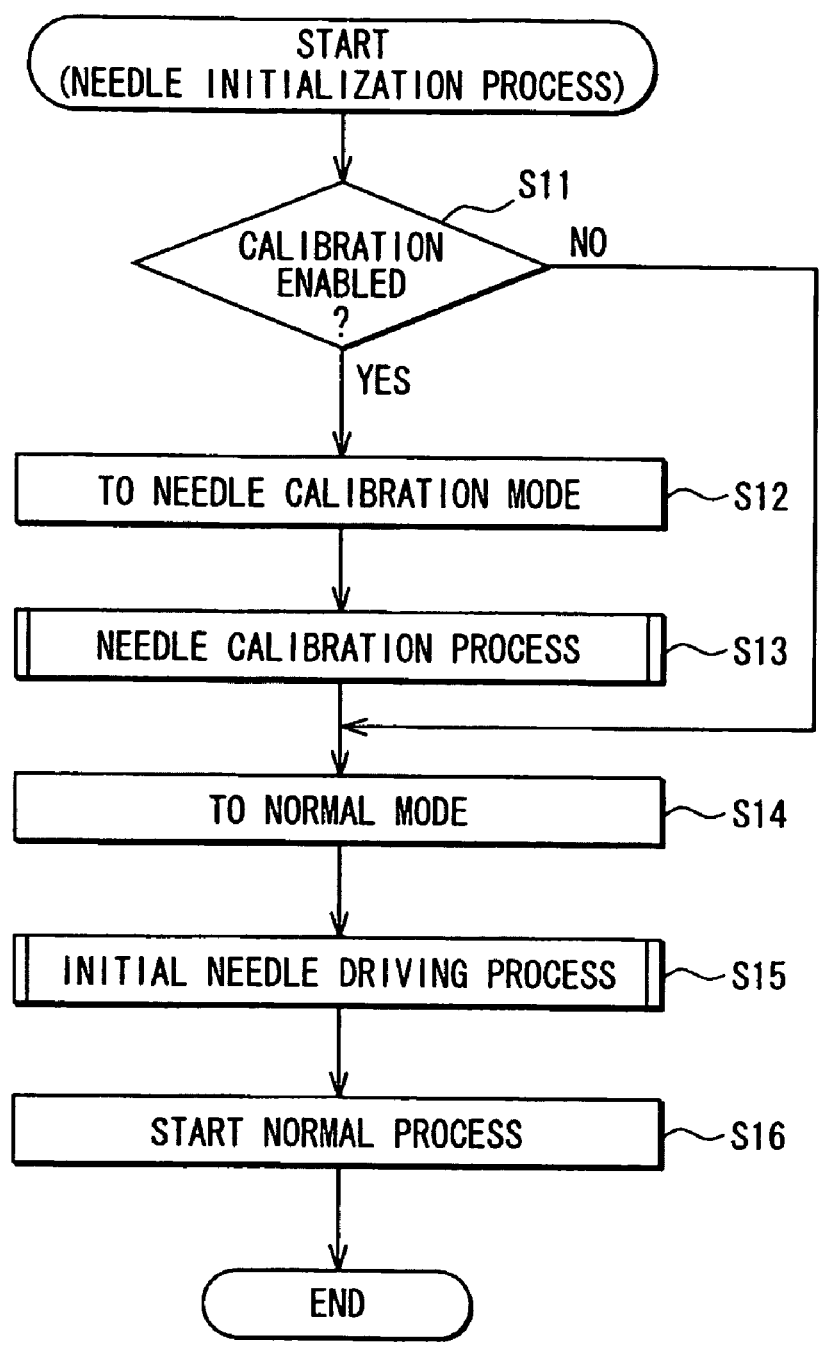
FIG. 5 is a flow chart exemplifying a needle initialization process.

With reference to a flow chart in FIG. 5, the following describes a needle initialization process corresponding to the initialization process at S1.

When the initialization process starts at S1 in FIG. 4, the process determines the presence or absence of the needle calibration enabling operation as shown at S11 in FIG. 5. According to the embodiment, the ignition switch 71 triggers the initialization process at S1 in FIG. 4. The presence or absence of the needle calibration enabling operation is determined based on whether the rear defroster selection switch 58 and the A/C switch 59 are operated simultaneously when the ignition switch 71 is turned on. When the needle calibration enabling operation is performed, the process enables the needle calibration mode at S12 (mode setup means). When the needle calibration mode is enabled, the control content for needle calibration is assigned to any of the setup operation sections 52 through 61 and 71. Enabling the needle calibration mode only permits needle calibration operations.

Figure 8:
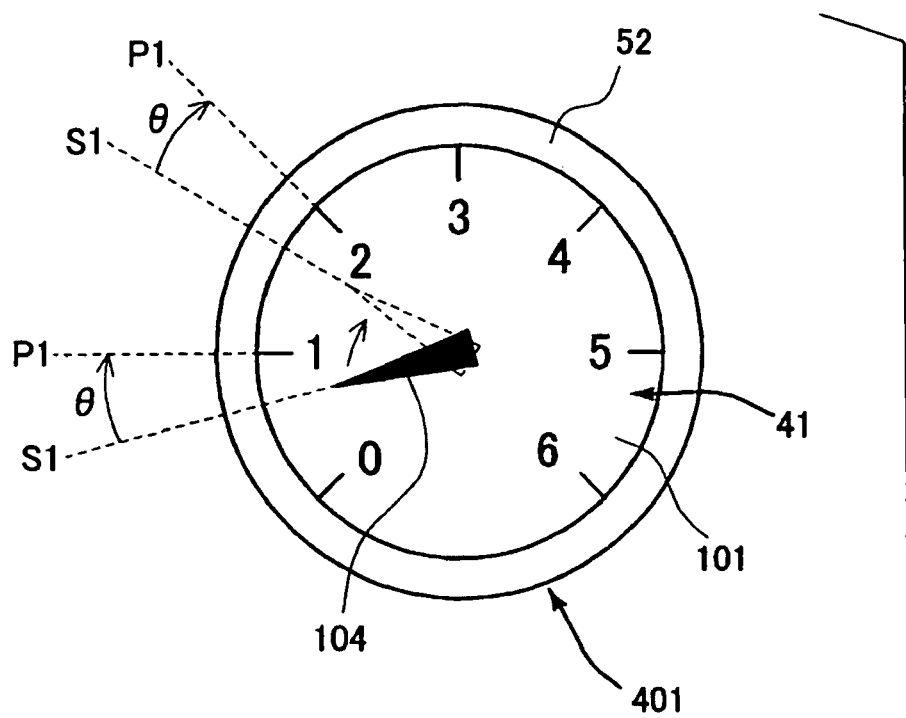
FIG. 8 illustrates a needle correction operation.
Figure 8:
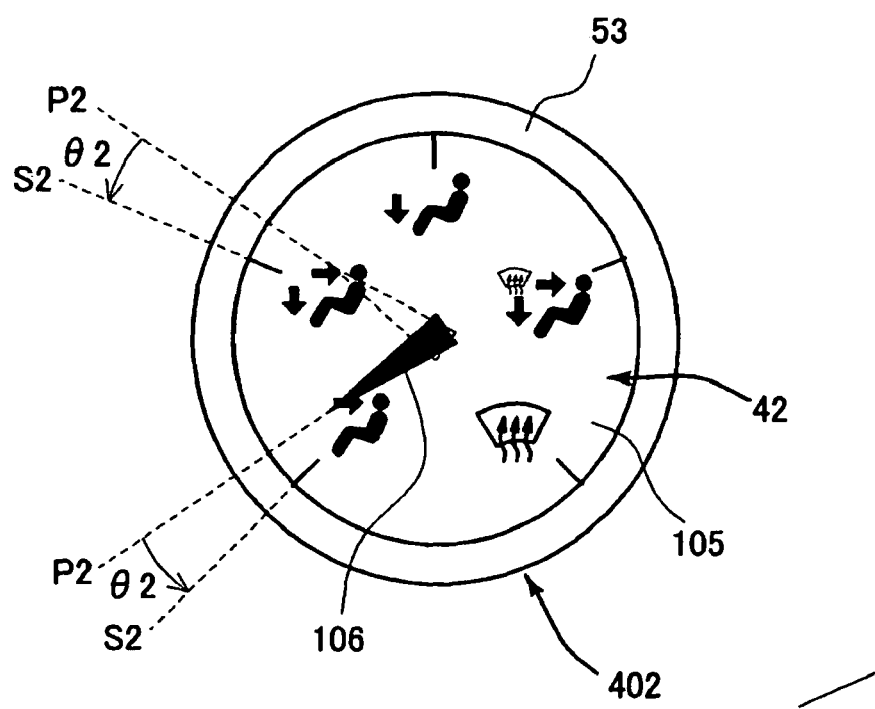

The needle calibration mode according to the embodiment assigns a control content for needle calibration to the setup operation section 54P as the temperature setting switch in the normal control mode so as to change the setting state of a start position S1 (FIG. 8) of the needle 104 over the dial 101. The setup operation section 54D as the temperature setting switch in the normal control mode is assigned a control content for needle calibration so as to change the setting state of a start position S2 of the needle 106 over the dial 105. When the needle calibration mode is enabled, the needle 104 can rotate in a forward direction (clockwise) over the dial 101 based on an input operation on the forward operation section 54Pu of the setup operation section 54P as the bidirectional operation section. The needle 104 can rotate in a reverse direction (counterclockwise) over the dial 101 based on an input operation on the reverse operation section 54Pd. When the needle calibration mode is selected, the needle 106 can rotate in a forward direction (clockwise) over the dial 105 based on an input operation on the forward operation section 54Du of the setup operation section 54D as the bidirectional operation section. The needle 106 can rotate in a reverse direction (counterclockwise) over the dial 101 based on an input operation on the reverse operation section 54Dd. Enabling the needle calibration mode inhibits a change in the setting state of the control content that is assigned in the normal control mode.

Further, the needle calibration mode according to the embodiment assigns the control content for terminating the needle calibration to the setup operation section 56 functioning as the OFF switch in the normal control mode so that the setup operation section 56 stores the current position of the needle 104 and terminates the needle calibration mode. In the needle calibration mode, the setup operation section 56 functions as a needle calibration information storage operation section and a needle calibration disabling section (normal needle calibration termination section). In the needle calibration mode, the setup operation sections 54D and 54P as the needle calibration section calibrate the positions of the needles 104 and 106 to new start positions S1 and S2 based on an operation predetermined for the setup operation section 56. The operation unit ECU 160 functions as a needle calibration information storage means that stores needle calibration information reflecting the new start positions S1 and S2 in a needle calibration information storage section 163c (FIG. 3). As mentioned above, the needles 104 and 106 rotate over the dials 101 and 105.

Furthermore, the needle calibration mode according to the embodiment assigns a control content for needle calibration termination to the setup operation section 71 as the ignition switch in the normal control mode so as to terminate the needle calibration mode without storing the current position of the needle 104. The setup operation section 71 functions as the needle calibration disabling section (needle calibration cancel section). Specifically, a repeated operation on the setup operation section 71 functioning as the ignition switch in the needle calibration mode is equivalent to the needle calibration cancel operation that stores no needle calibration information in the needle calibration information storage section 163c (FIG. 3).

The needle calibration mode may allow the setup operation section assigned no control content for needle calibration to retain the control content assigned in the normal control mode or may disable an operation on that setup operation section.

Figure 6:
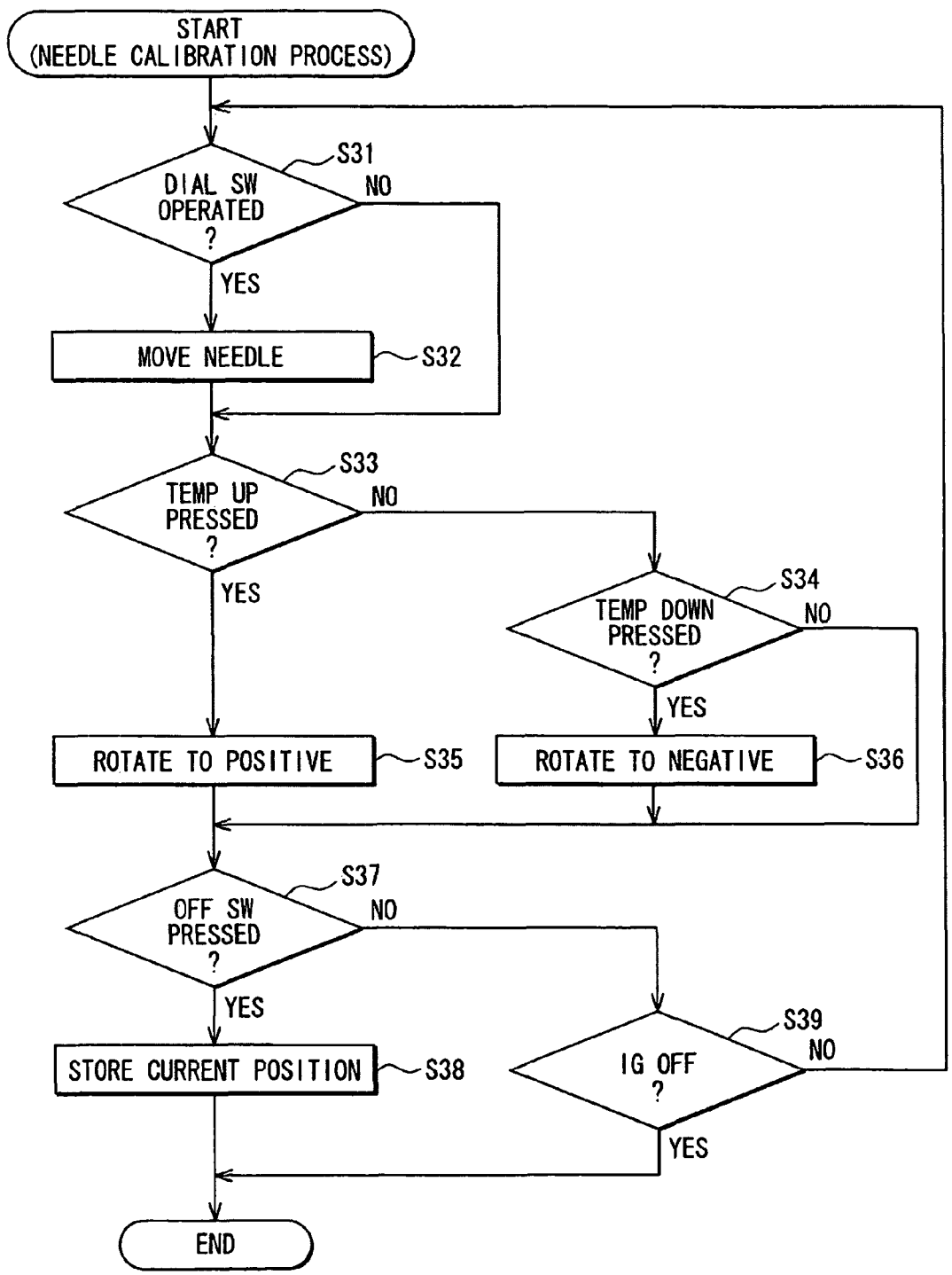
FIG. 6 is a flow chart exemplifying a needle correction process.

At S13, a needle correction process starts. FIG. 6 shows the process in detail. At S31, the process determines whether or not the dial switch (rotary operation section) 52 or 53 is operated. When none of the dial switches 52 and 53 is operated, the process skips S32 and then proceeds to S33. When the dial switch 52 or 53 is operated, the process proceeds to S32 and moves the corresponding needles 104 or 106 on a scale basis in accordance with the operation on the dial switch 52 or 53. Operating the dial switch 52 or 53 moves the needle 104 or 106 to a calibrated scale position. Similarly to the normal control mode, the needle 104 or 106 moves on a scale basis.

At S33 and S34, the process respond to operations on the setup operation sections 54D and 45P as the needle calibration sections and drives the corresponding needles 104 and 106. Specifically, operating the forward operation section 54Pu of the setup operation section 54P as the bidirectional operation section can rotate the needle 104 over the dial 101 forward or clockwise to the positive side at S35. Operating the reverse operation section 54Pd can rotate the needle 104 over the dial 101 reversely or counterclockwise to the negative side at S36. Similarly, operating the forward operation section 54Du of the setup operation section 54D as the bidirectional operation section can rotate the needle 106 over the dial 105 forward or clockwise to the positive side at S35. Operating the reverse operation section 54Dd can rotate the needle 106 over the dial 105 reversely or counterclockwise to the negative side at S36.

The setup operation section 54D or 54P functions as the needle calibration section. Pressing the setup operation section 54D or 54P moves the needle 104 or 106 so that the setup operation section 54D or 54P is kept pressed within a predetermined time period (referred to as one-press operation). A movement displacement or a minimum movement displacement is smaller than maximum allowable error θ between the start position and the scale position for incremental rotation of the needle over the dial. The maximum allowable error θ is specified as a standard for any of a vehicle, an onboard electronic device (onboard air conditioner according to the embodiment), and a display apparatus. The movement displacement is preferably defined to be smaller than or equal to one degree on the dial 101 or 105. According to the embodiment, the movement displacement is defined to be 0.19 degrees.

At S37, the process determines the presence or absence of a needle calibration termination operation by storing the needle calibration information as mentioned above. This needle calibration termination operation is hereafter referred to as a normal needle calibration termination operation. When the normal needle calibration termination operation is performed, the process proceeds to S38 and stores the current needle position as the needle calibration information in the needle calibration information storage section 163c (FIG. 3). Specifically, the setup operation section 54D or 54P as the needle calibration section is operated in the needle calibration mode to calibrate the needle position by directly moving the needle 104 or 106 to the new start position S1 or S2. The needle 104 or 106 indicates movement displacement θ1 or θ2 that is stored as the needle calibration information in the needle calibration information storage section 163c. The needle calibration information storage section 163c is provided as a partial storage area of the flash memory 163. The stored needle calibration information is reserved after the ignition power is turned off. Upon completion of S38, the process terminates the program and proceeds to S14 in FIG. 5. When the normal needle calibration termination operation is not performed, the process proceeds to S39.

At S39, the process determines the presence or absence of a needle calibration termination operation without storing the needle calibration information as mentioned above. The operation is hereafter referred to as a needle calibration cancel operation. When the needle calibration cancel operation is performed, the program terminates. When the needle calibration cancel operation is not performed, the needle correction process returns to S31 and continues. The needle calibration cancel operation according to the embodiment is equivalent to the operation of the ignition switch 71. When the operation turns off the ignition power and the accessory power, the process in FIG. 5 is terminated forcibly. When the operation turns off the ignition power, the process proceeds to S14 in FIG. 5.

Let us return to FIG. 5. At S14, the process enables the normal control mode. The needle calibration mode is enabled if the needle calibration enabling operation is performed at S11. Thus enabled needle calibration mode is changed to the normal control mode. The normal control mode remains active when the needle calibration enabling operation is not performed at S11. At S14, the process assigns normal control contents different from those for needle calibration to the setup operation sections 52 through 61 and 71.

Figure 7:
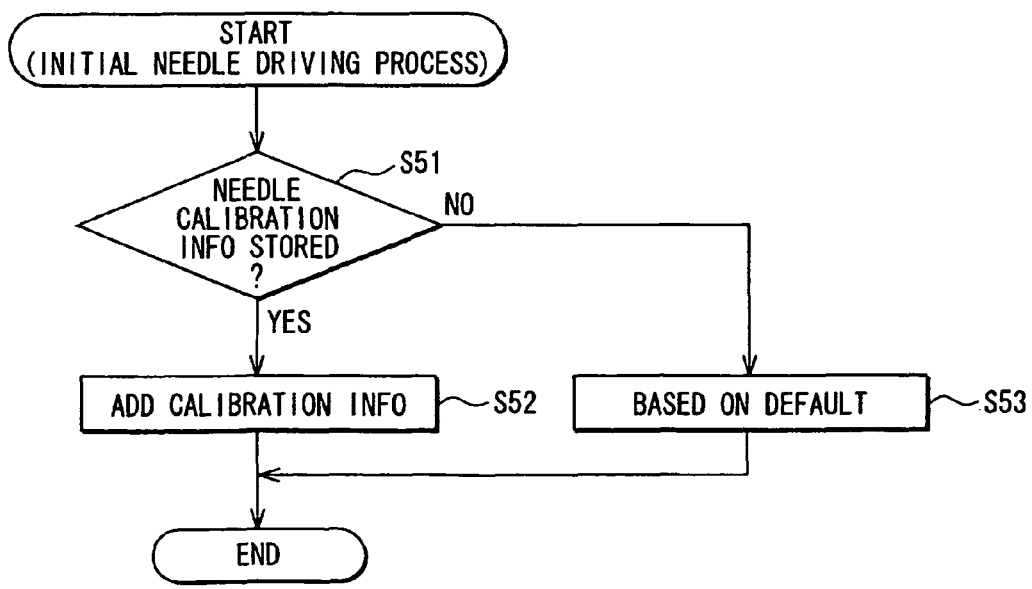
FIG. 7 is a flow chart exemplifying a initial needle driving process.

At S15, an initial needle driving process is performed. FIG. 7 shows the process in detail. At S51, the process determines whether or not the needle calibration information storage section 163c (FIG. 3) stores the needle calibration information. When the needle calibration information is stored, the information provides the start positions S1 and S2. The process controls the needle driving motors 181 and 191 so that the needles 104 and 106 incrementally (or stepwise) rotate on a scale basis with reference to the start positions S1 and S2 as new start positions at S52. Specifically, the process adds a movement displacement stored as the needle calibration information to the needle start position that is stored by default for the needle to incrementally rotate. The process drives the needle driving motors 181 and 191 by outputting a calibration driving pulse signal based on the movement displacement (needle calibration information) to the motor driver 182 so that the calculated position is used as a new start position. In this manner, the needles 104 and 106 move to the calibrated new start positions S1 and S2. The operation unit ECU 160 as well as the motor drivers 182 and 192 function as the needle operation control means for controlling the needle driving motors so as to move the needle over the dial in accordance with the specified operation control mode. There may be an error between the scale position P1 or P2 and the start position S1 or S2 of the needle 104 or 106 for incremental rotation. The error is automatically corrected based on the most recently stored needle calibration information. The process then proceeds to S16 and starts the normal control process. Control is passed to S2 in FIG. 4 after termination of the other initialization processes including the needle initialization process.

At S51, it may be determined that needle calibration information storage section 163c (FIG. 3) does not store the needle calibration information. In this case, the process proceeds to S53 and reads default settings of the start positions S1 and S2 for the needles 104 and 106. The default settings are stored in another storage area. The process controls the needle driving motors 181 and 191 so as to start incrementally rotating the needles 104 and 106 from the start positions S1 and S2. Specifically, the flash memory stores default settings of the start positions S1 and S2 for the needles 104 and 106.

While there have been described specific preferred embodiments of the present invention, it is to be distinctly understood that the present invention is not limited thereto but may be otherwise variously embodied within the spirit and scope of the invention.

For example, the embodiment allows the needle correction process to perform only when or immediately after the ignition power is turned on so as to prevent the needle calibration mode from being enabled inadvertently. For example, the needle correction process may be performed at any timing by defining another switch or operation input section such as the automatic switch 55 instead of using the ignition switch 71 for the needle calibration enabling operation and the needle calibration cancel operation.

In the embodiment, the needle calibration section may not be bidirectional. For example, a dial operation unit or a dial operation section may be used as the needle calibration section. The dial operation unit is provided with a cylindrical dial switch as the rotary operation section. The dial operation unit is also provided with the needle-type display apparatus that is independent of the dial switch even when rotated. In short, the dial switch may be used as the needle calibration section. Specifically, the needle of the needle-type display apparatus built in the dial operation unit moves with rotation of the dial switch provided around the needle-type display apparatus. In the normal control mode, the needle incrementally rotates on a scale basis so as to change control parameter settings. In the needle calibration mode, the needle rotates in increments of a unit (minimum movement displacement) smaller than the scale so as to calibrate the needle position. It is preferable to define the movement unit to be smaller than the maximum allowable error θ as the standard or, more specifically, smaller than or equal to one degree on the dial 101 or 105.

According to the embodiment, the needle calibration enabling operation is defined to be simultaneously operating multiple needle calibration enabling sections (referred to as simultaneous-press operation), but is not limited thereto. For example, there may be provided one needle calibration enabling section instead of two or more. The needle calibration enabling operation may require a longer time to continue a specified operation state than the normal operation (referred to as long-press operation) or may be a sequential operation to operate predetermined multiple needle calibration enabling sections according to a predetermined sequence (referred to as patterned-press operation). Further, the needle calibration enabling operation may be any combination of the simultaneous multiple operations, the state continuing operation, and the sequential operation. The combination is given greater difficulty than each needle calibration enabling operation so as not to easily enable the needle calibration mode.

As shown in FIG. 6, the operation unit ECU 160 performs the needle correction process. The needle correction process may be programmed to terminate the needle calibration mode and enable the normal control mode after the needle calibration mode is enabled and the needle calibration section is not operated for a predetermined time such as 30 seconds. In this case, the operation unit ECU 160 functions as a forced mode change means according to the embodiment.

The needle calibration section can be constructed to be inoperable in the normal control mode differently from the embodiment. For example, the needle calibration section can be protruded to a position capable of operation in the normal control mode and can be retracted to a position incapable of operation in the normal control mode.

Figure 9:
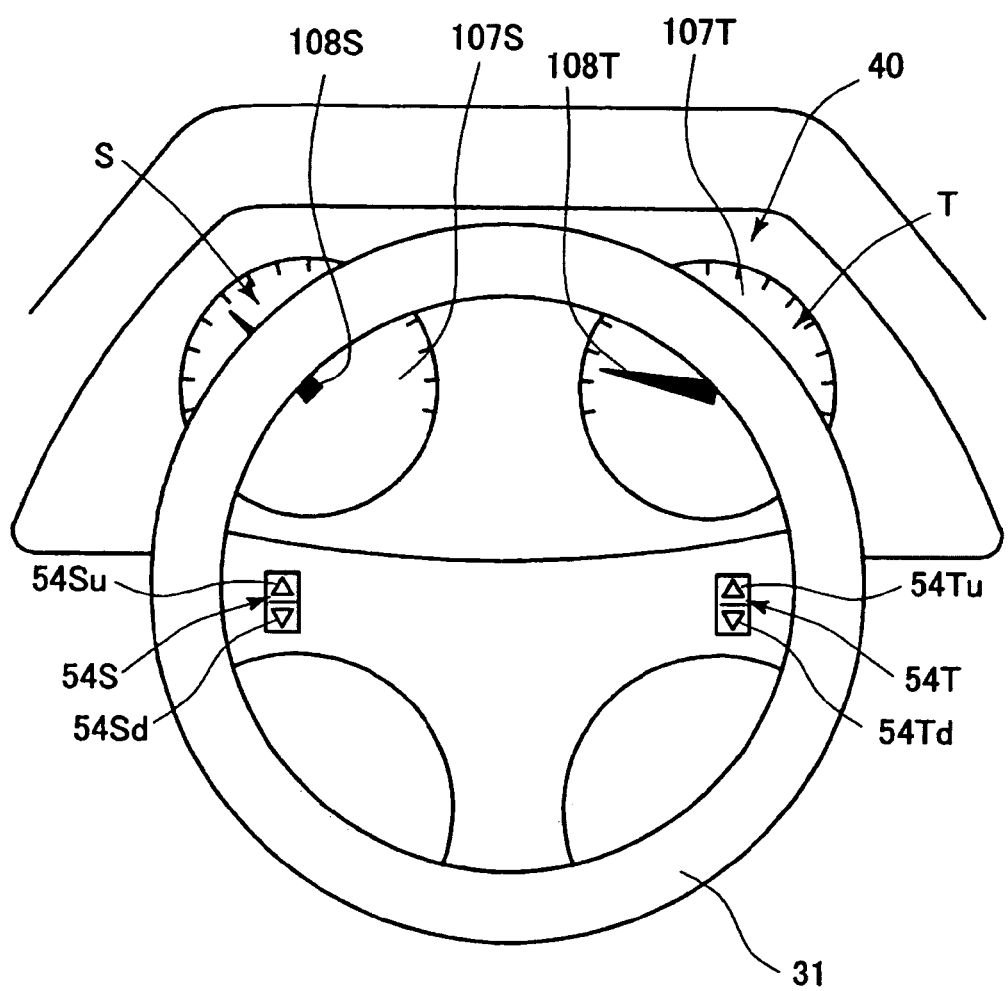
FIG. 9 shows another onboard electronic device operating unit different from FIG. 1.

The needle-type display apparatus according to the embodiment may be a meter display apparatus 40 as shown in FIG. 9. The meter display apparatus 40 displays at least a vehicle speed and is positioned farther from the driver's seat over the steering wheel 31. The meter display apparatus 40 in FIG. 9 is provided with a speedometer S on the left and a tachometer T on the right viewed from the steering wheel 31. Dials 107S and 107T have needles 108S and 108T, respectively. The steering wheel 31 is provided with the needle calibration sections 54 (54S and 54T) left and right for performing the needle position calibration on the needles 108S and 108T. The needle calibration section 54S corresponding to the speedometer S calibrates the needle 108S of the speedometer S. The needle calibration section 54T corresponding to the tachometer T calibrates the needle 108T of the tachometer T. The needle calibration sections 54S and 54T are bidirectional. The needle calibration sections 54S and 54T each have forward operation sections 54Su and 54Tu and reverse operation sections 54Sd and 54Td vertically. In the normal control mode, the operation section 54S is assigned a control content for increasing and decreasing air conditioner temperatures. The operation section 54T is assigned a control content for increasing and decreasing audio volumes. A predetermined needle calibration enabling operation activates the corresponding needle calibration section. The needle calibration enabling operation can be initiated by simultaneously pressing an unshown hazard indicator switch and the ignition switch 71, for example. By contrast, the normal needle calibration termination operation can be initiated by operating the unshown hazard indicator switch similarly to the normal operation of turning on a hazard indicator.

Multiple needle-type display apparatuses are provided for the meter display apparatus 40 and the needle-type display apparatuses such as the first and second display apparatuses 41 and 42 mounted on the chassis panel 110 for the air conditioner. The apparatuses may be collectively set to the needle calibration mode using a common needle calibration enabling section and a common needle calibration enabling operation. It may be preferable to provide a common needle calibration disabling section and a common needle calibration termination operation for collectively resuming the normal control mode.

According to the embodiment, the needle calibration mode allows the needle calibration section to perform the needle calibration. Based on this construction, a vehicle diagnosis tool may be capable of enabling the needle calibration mode through the use of communication. A needle calibration section provided for the vehicle diagnosis tool may be capable of enabling the needle calibration.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

Aspects of the disclosure described herein are set out in the following clauses.

As an aspect of the disclosure, an onboard electronic device operating unit is provided as follows. A plurality of setup operation sections are configured to change setting states of a variety of control contents for an onboard electronic device. A current setting state acquisition means is configured to acquire a current setting state of the variety of control contents. A needle-type display apparatus is configured to have a dial, a needle rotatably provided over the dial, and a needle driving motor for performing incremental rotation of the needle, wherein the dial has a scale so as to be capable of directly reading the current setting state of a predetermined control content for needle display out of the variety of control contents. A needle calibration section is configured to calibrate a start position for the incremental rotation of the needle over the dial in units of the scale. A mode change operation section is configured to change between a normal control mode and a needle calibration mode as an operation control mode for the needle, the normal control mode controlling the needle driving motor so as to move the needle over the dial in accordance with the acquired current setting state of the control content for needle display, the needle calibration mode controlling the needle driving motor so as to move the needle over the dial in accordance with an operation on the needle calibration section. A mode setup means is configured to set the operation control mode based on an operation state of the mode change operation section. A needle operation control means is configured to control the needle driving motor in accordance with the operation control mode so as to move the needle over the dial.

Thus, a user in a vehicle compartment can adjust a needle position on a needle-type display apparatus by operating a needle calibration section provided in the vehicle compartment. The user is capable of needle position calibration only when enabling a needle calibration mode different from a normal control mode using a mode change operation section. It is possible to prevent a needle position from being changed inadvertently.

The mode change operation section can include a needle calibration enabling section for enabling the needle calibration mode. The needle calibration enabling section can be provided so as to belong to one or more predetermined setup operation sections. There is no need to provide a new mode change operation section in addition to the existing setup operation section. A space for arranging the operation sections can be used effectively.

One or more needle calibration enabling sections can be previously provided with a needle calibration enabling operation for enabling the needle calibration mode. The needle calibration enabling operation differs from a normal operation for changing a setting state of a control content assigned in the normal control mode. The operation different from the usual normal operation enables the needle calibration mode, preventing the needle calibration mode from being enabled inadvertently to change a needle position unintendedly. Further, the needle calibration enabling operation can include an operation that requires greater difficulty (more procedures or more operational items) than a normal operation individually performed on the mode change operation section. This makes it possible to more effectively prevent an unintended change of the needle position.

An example of the needle calibration enabling operation different from the normal operation is to operate or press a predetermined needle calibration enabling section for a time period longer than that for the normal operation (a long-press operation). Another example is to sequentially operate or press predetermined multiple needle calibration enabling sections in a predetermined order (a patterned-press operation). Yet another example is to simultaneously operate or press predetermined multiple needle calibration enabling sections (a simultaneous-press operation). A combination of these operations may be available.

The mode change operation section can include a needle calibration disabling section for terminating the needle calibration mode and resuming the normal control mode. In this case, the needle calibration disabling section belongs to one or more predetermined setup operation sections. There is no need to provide a new mode change operation section in addition to the existing setup operation section. A space for arranging the operation sections can be used effectively.

The needle calibration disabling section can belong to one setup operation section. The normal operation changes the setting state of a control content assigned in the normal control mode. The same operation as the normal operation can be predetermined as a needle calibration termination operation for the one setup operation section. It is effective to make the needle calibration enabling operation more complicated in order to prevent an unintended change of the needle position. By contrast, it is preferable to make the needle calibration termination operation simpler in order to promptly resume the normal control mode. The normal control mode can be resumed more promptly by selecting only one needle calibration disabling section and using the same operation as the normal operation for resuming the normal control mode.

It is preferable that the needle calibration enabling section and the needle calibration disabling section belong to multiple setup operation sections different from each other. This makes it possible to clearly distinguish between the needle calibration enabling operation and the needle calibration termination operation, preventing the mode from being changed due to an inadvertent user operation.

The onboard electronic device operating unit can include a needle calibration information storage means for storing needle calibration information in a needle calibration information storage section. The needle calibration information reflects the start position of a needle incrementally rotating over a dial that is calibrated in the needle calibration mode by the needle calibration section based on an operation on a predetermined needle calibration information storage operation section. In the normal control mode, a needle operation control means can control a needle driving motor so that the needle incrementally rotates on a scale basis with reference to a start position indicated by the stored needle calibration information. The needle calibration information is stored according to the construction. The use of the needle calibration information can always incrementally rotate the needle with reference to the calibrated start position.

The needle calibration information storage section may preserve the needle calibration information after the power is turned off. When the needle calibration information is preserved after the power is turned off, there is no need for the needle position calibration each time the power is turned on.

To calibrate the start position, the needle calibration section can be operated in the needle calibration mode to move the position of the needle over the dial. That is, the needle calibration section can calibrate the start position by operating the needle calibration section to directly move the needle to a new start position in the needle calibration mode. In this case, the needle calibration information storage means allows an operation on the needle calibration information storage operation section to store a movement displacement of the moved needle as the needle calibration information in the needle calibration information storage section. When the needle calibration mode changes to the normal control mode, the needle operation control means adds the needle movement displacement stored as the needle calibration information to a default start position of the needle for incremental rotation. The calculated position can be used as a new start position to start rotating the needle incrementally. The needle position can be easily calibrated by visually checking the needle over the dial.

The needle calibration disabling section can include a normal needle calibration termination section belonging to the needle calibration information storage operation section. Terminating the needle calibration mode also stores the calibrated needle position, making it possible to reduce an operational load from the user. The needle calibration disabling section can include a needle calibration cancel section that changes the needle calibration mode to the normal control mode without storing the needle calibration information. There may be a case where a normal control need to take precedence over incomplete needle calibration. The normal control mode can be resumed without reflecting the incomplete needle calibration state.

The onboard electronic device operating unit can be provided with a forced mode change means for terminating the needle calibration mode and resuming the normal control mode when no input operation is performed on the needle calibration section in the needle calibration mode during a specified time period. The user can avoid inadvertently enabling the needle calibration mode for an unintended needle calibration operation.

The needle calibration section can belong to a predetermined setup operation section. There is no need to provide a new needle calibration section in addition to the existing setup operation section. A space for arranging the operation sections can be used effectively. The needle calibration mode may disable the remaining setup operation sections to which no needle calibration section belongs.

The needle calibration section can be inoperative in the normal control mode, eliminating a possibility of inadvertently changing the needle position. To make the needle calibration section inoperative in the normal control mode, the mode setup means assigns the following to the setup operation section belonging to the needle calibration section. In the needle calibration mode, the mode setup means assigns a needle calibration control content for changing the setting state of the needle over the dial. In the normal control mode, the mode setup means assigns a control content different from the needle calibration control content. In this manner, the normal control mode can disable needle calibration operations on the needle calibration section.

The needle operation control means calibrates the start position of the needle for incremental rotation based on an operation on the needle calibration section. A resolution of the needle operation control means can be finer than a predetermined maximum allowable error corresponding to a difference between the start position of the needle for incremental rotation and a scale position on the dial. The calibration can be optimized because the needle calibration resolution can be more fine-tuned than the maximum allowable error predetermined as the standard for a vehicle or the onboard electronic device operating unit.

The needle calibration section can be provided as a bidirectional operation section having forward and reverse operation sections. The forward operation section changes a control parameter value in a positive direction in the normal control mode. The reverse operation section changes the same in a direction reverse to the positive direction. In the normal control mode, the forward and reverse operations of the bidirectional operation section can directly correspond to the needle calibration operations. The needle calibration method can be easily understandable. Specifically, the bidirectional operation section can be provided with the forward and reverse operation sections at different positions. On the other hand, the needle calibration section can be provided as a dial operation section that can be rotated bidirectionally around a predetermined axis.

The bidirectional operation section can be provided as a rocker switch. In this case, the same chassis panel can be provided with two needle-type display apparatuses and two rocker switches. The needle-type display apparatus can correspond to the rocker switch in the needle calibration mode as follows. One rocker switch functions as the needle calibration section of one needle-type display apparatus. The other rocker switch functions as the needle calibration section of the other needle-type display apparatus. Based on the correspondence relation, the mode setup means can assign the needle calibration section to the corresponding rocker switch in the needle calibration mode. The needle calibration section changes the setting state of a start position for the needle included in each needle-type display apparatus. The rocker switch functions as the bidirectional operation section and is suitable for the needle calibration as mentioned above. In the needle calibration mode, the user can easily assume the rocker switch to be the needle calibration operation section. There are provided the same number of needle-type display apparatuses and rocker switches, for example, two needle-type display apparatuses and two rocker switches. It is possible to easily assume a possibility of correspondence between any one of the rocker switches and any one of the needle-type display apparatuses and easily assume some relation between both. Owing to easiness of such assumptions, the rocker switch can be easily assumed to be the needle calibration section in the needle calibration mode. The above-mentioned construction makes it possible to easily comprehend where the needle calibration section is provided.

The two rocker switches can be arranged left and right on the chassis panel corresponding to left and right seats of the vehicle. The two needle-type display apparatuses can be also arranged left and right on the chassis panel corresponding to left and right seats of the vehicle. The needle-type display apparatus can correspond to the rocker switch for the same seat. The positional relation on the chassis panel makes it possible to easily determine which rocker switch calibrates the needle of which needle-type display apparatus in the needle calibration mode.

In the vehicle, the driver's seat is located left and the passenger seat is located right, or vice versa. The onboard electronic device is an onboard air conditioner capable of switching between dedicated control and collective control. The dedicated control controls air conditioning output for one of the driver's seat and the passenger seat independent of each other. The collective control controls air conditioning output for the driver's seat and the passenger seat together. The chassis panel can be an air conditioner panel provided with multiple setup operation sections and the needle-type display apparatus. In this case, the mode setup means, during the dedicated control in the normal control mode, assigns the rocker switch corresponding to the driver's seat with a control content specifying operational input for air conditioning output to the driver's seat and assigns the rocker switch corresponding to the passenger seat with a control content specifying operational input for air conditioning output to the passenger seat. The mode setup means, based on the correspondence relation in the needle calibration mode, assigns the rocker switch corresponding to the driver's seat with a control content for the needle calibration on the needle-type display apparatus for the driver's seat and assigns the rocker switch corresponding to the passenger seat with a control content for the needle calibration on the needle-type display apparatus for the passenger seat. When the vehicle is provided with a function of switching between the collective control and the dedicated control over air conditioning output, input sections used for the dedicated control originally include input sections for the driver's seat and the passenger seat. According to the above-mentioned construction, the needle calibration mode directly inherits the correspondence relation between both input sections and seats. The input section can be assigned a needle calibration control content and can function as the needle calibration section for the corresponding seat. The input sections or two rocker switches correspond to air conditioning outputs for the driver's seat and the passenger seat and are used for the dedicated control. The input section can be used as a temperature setting switch for setting a targeted outlet temperature for the corresponding seat under the dedicated control in the normal control mode.

The needle calibration section can belong to a setup operation section for changing the setting state of the control content for needle indication in the normal control mode. The needle calibration section in the needle calibration mode can be used as a setup operation section assigned with an operation related to needle movement in the normal control mode. The operations are related to needle movement, making it possible to intuitively identify the position of the needle calibration section assigned in the needle calibration mode.

The onboard electronic device can be embodied as an onboard air conditioner. An air conditioner panel of the vehicle can be provided with multiple setup operation sections and needle-type display apparatuses. The air conditioner panel is often provided with a needle-type display apparatus so as to intuitively understand control parameters. In this case, the control parameter setup operation section of the onboard air conditioner can include a dial operation section capable of rotational operation around a predetermined axis. The dial operation section can be provided with a cylindrical rotary operation section. The needle-type display apparatus can be mounted so as to be independent of the rotational operation on the rotary operation section. A limited space on the air conditioner panel can be effectively used.

The needle-type display apparatus can be embodied as a meter display apparatus that is visible from the driver's seat and indicates at least a vehicle speed. The meter display apparatus represents the most typical needle-type display apparatus for vehicles.

It will be obvious to those skilled in the art that various changes may be made in the above-described embodiments of the present invention. However, the scope of the present invention should be determined by the following claims.

What is claimed is:

1. An onboard electronic device operating unit comprising:
    a plurality of setup operation sections capable of changing setting states of control contents for an onboard electronic device;
    a current setting state acquisition means for acquiring a current setting state of the control contents;
    a needle-type display apparatus having a dial, a needle rotatably provided over the dial, and a needle driving motor for performing incremental rotation of the needle, wherein the dial has a scale so as to be capable of directly reading the current setting state of a predetermined control content for needle display out of the control contents;
    a needle calibration section for calibrating a start position for the incremental rotation of the needle over the dial in units of the scale;
    a mode change operation section for changing between a normal control mode and a needle calibration mode as an operation control mode for the needle, the normal control mode controlling the needle driving motor so as to move the needle over the dial in accordance with the acquired current setting state of the control content for needle display, the needle calibration mode controlling the needle driving motor so as to move the needle over the dial in accordance with an operation on the needle calibration section;
    a mode setup means for setting the operation control mode based on an operation state of the mode change operation section; and
    a needle operation control means for controlling the needle driving motor in accordance with the operation control mode so as to move the needle over the dial.

2. The onboard electronic device operating unit according to claim 1,
    wherein the needle calibration section is provided so as to be inoperable in the normal control mode.

3. The onboard electronic device operating unit according to claim 1,
    wherein the mode change operation section has a needle calibration enabling section for enabling the needle calibration mode, and
    wherein the needle calibration enabling section belongs to predetermined one or more setup operation sections.

4. The onboard electronic device operating unit according to claim 3,
    wherein the predetermined one or more setup operation sections are assigned a predetermined needle calibration enabling operation for enabling the needle calibration mode, and
    wherein the needle calibration enabling operation is different from a normal operation that changes the setting state of control content assigned in the normal control mode.

5. The onboard electronic device operating unit according to claim 4,
    wherein the needle calibration enabling operation requires greater difficulty than the normal operation individually performed on the mode change operation section.

6. The onboard electronic device operating unit according to claim 4,
    wherein the needle calibration enabling operation includes an operation that requires the needle calibration enabling section to keep a longer time than the normal operation.

7. The onboard electronic device operating unit according to claim 4,
    wherein the needle calibration enabling operation includes a sequential operation that operates predetermined several needle calibration enabling sections in accordance with a predetermined sequence.

8. The onboard electronic device operating unit according to claim 4,
    wherein the needle calibration enabling operation includes a simultaneous operation on predetermined several needle calibration enabling sections.

9. The onboard electronic device operating unit according to claim 3,
    wherein the mode change operation section includes a needle calibration disabling section that terminates the needle calibration mode and resumes the normal control mode, and
    wherein the needle calibration disabling section belongs to predetermined one or more setup operation sections.

10. The onboard electronic device operating unit according to claim 9,
    wherein the needle calibration disabling section belongs to a single setup operation section and defines a normal operation in the normal control mode for changing a setting state of the control content assigned to the single setup operation section as a needle calibration termination operation for resuming the normal control mode.

11. The onboard electronic device operating unit according to claim 9,
    wherein the needle calibration enabling section and the needle calibration disabling section individually belong to mutually different setup operation sections of the plurality of setup operation sections.

12. The onboard electronic device operating unit according to claim 1, comprising:
    a needle calibration information storage means for storing needle calibration information in a needle calibration information storage section, the needle calibration information reflecting a start position of the needle, which incrementally rotates over the dial, the start position being calibrated by the needle calibration section in the needle calibration mode based on an operation on a predetermined needle calibration information storage operation section, wherein the needle operation control means controls the needle driving motor in the normal control mode with reference to the start position corresponding to the stored needle calibration information so that the needle incrementally rotates in units of the scale.

13. The onboard electronic device operating unit according to claim 12, wherein the needle calibration information storage section preserves the needle calibration information even after power is turned off.

14. The onboard electronic device operating unit according to claim 12, wherein the needle calibration section is operated in the needle calibration mode to calibrate the start position by moving the needle over the dial to a given position, wherein, when the needle calibration information storage operation section is operated to move a needle, the needle calibration information storage means stores a movement displacement of the moved needle as the needle calibration information in the needle calibration information storage section, and wherein, when the needle calibration mode changes to the normal control mode, the needle operation control means adds a movement displacement of the needle stored as the needle calibration information to a default start position of the needle for incremental rotation and starts incrementally rotating the needle using a calculated position as a new start position.

15. The onboard electronic device operating unit according to claim 12, wherein the mode change operation section has a needle calibration enabling section for enabling the needle calibration mode, wherein the needle calibration enabling section belongs to predetermined one or more setup operation sections, wherein the mode change operation section includes a needle calibration disabling section that terminates the needle calibration mode and resumes the normal control mode, wherein the needle calibration disabling section belongs to predetermined one or more setup operation sections, and wherein the needle calibration disabling section includes a normal needle calibration termination section belonging to the needle calibration information storage operation section.

16. The onboard electronic device operating unit according to claim 15, wherein the needle calibration disabling section includes a needle calibration cancel section that changes the needle calibration mode to the normal control mode without storing the needle calibration information.

17. The onboard electronic device operating unit according to claim 1, comprising a forced mode change means for terminating the needle calibration mode and resuming the normal control mode when no operation is performed on the needle calibration section in the needle calibration mode during a predetermined time period.

18. The onboard electronic device operating unit according to claim 1, wherein the needle calibration section is provided so as to be inoperable in the normal control mode, and wherein the needle calibration section belongs to a predetermined setup operation section.

19. The onboard electronic device operating unit according to claim 18, wherein the mode setup means provides the setup operation section belonging to the needle calibration section with a needle calibration control content for changing a setting state of a start position of the needle over the dial in the needle calibration mode and provides the setup operation section with a control content different from the control content in the normal control mode.

20. The onboard electronic device operating unit according to claim 19, wherein the needle operation control means calibrates the start position of the needle for incremental rotation in accordance with an operation on the needle calibration section and a resolution of the needle operation control means is smaller than a maximum allowable error that is defined for a difference between the start position of the needle for incremental rotation and a scale position on the dial.

21. The onboard electronic device operating unit according to claim 19, wherein the needle calibration section is provided as a bidirectional operation section including a forward operation section and a reverse operation section that are provided at different positions, and wherein the forward operation section changes a control parameter value in a positive direction and the reverse operation section changes the control parameter value in a direction reverse to the positive direction in the normal control mode.

22. The onboard electronic device operating unit according to claim 21, wherein the bidirectional operation section is constructed as a rocker switch.

23. The onboard electronic device operating unit according to claim 22, further comprising:

another needle-type display apparatus which is identical to the needle-type display apparatus, each needle-type display apparatuses corresponding to the rocker switch so that one rocker switch functions as the needle calibration section for one needle-type display apparatus and the other rocker switch functions as the needle calibration section for the other needle-type display apparatus in the needle calibration mode, wherein a same chassis panel is provided with the two needle-type display apparatuses and the two rocker switches, wherein the mode setup means assigns the needle calibration section to the rocker switch corresponding to the needle-type display apparatus based on the correspondence relation in the needle calibration mode, and wherein the needle calibration section changes a setting state of the start position for the needle included in the needle-type display apparatus.

24. The onboard electronic device operating unit according to claim 23, wherein the two rocker switches are arranged on the chassis panel left and right corresponding to left and right seats of a vehicle, wherein the two needle-type display apparatuses are arranged on the chassis panel left and right corresponding to left and right seats of the vehicle, and wherein the same seat is assigned with a corresponding set of the needle-type display apparatus and the rocker switch.

25. The onboard electronic device operating unit according to claim 24,
wherein left and right seats of the vehicle are used as a driver's seat and a passenger seat,
wherein the onboard electronic device is an onboard air conditioner capable of switching between dedicated control and collective control,
wherein the dedicated control controls conditioning output for one of the driver's seat and the passenger seat independent of each other,
wherein the collective control controls conditioning output for the driver's seat and the passenger seat together,
wherein the chassis panel is an air conditioner panel provided with the plurality of setup operation sections and the needle-type display apparatus,
wherein the mode setup means, during the dedicated control in the normal control mode, assigns the rocker switch corresponding to the driver's seat with a control content specifying operational input for air conditioning output to the driver's seat and assigns the rocker switch corresponding to the passenger seat with a control content specifying operational input for air conditioning output to the passenger seat, and
wherein the mode setup means, based on the correspondence relation in the needle calibration mode, assigns the rocker switch corresponding to the driver's seat with a control content for the needle calibration on the needle-type display apparatus for the driver's seat and assigns the rocker switch corresponding to the passenger seat with a control content for the needle calibration on the needle-type display apparatus for the passenger seat.

26. The onboard electronic device operating unit according to claim 25,
wherein the two rocker switches are temperature setting switches for setting a target outlet temperature for a corresponding seat during the dedicated control in the normal control mode.

27. The onboard electronic device operating unit according to claim 18,
wherein the needle calibration section belongs to the setup operation section that changes a setting state of the control content for needle display in the normal control mode.

28. The onboard electronic device operating unit according to claim 19,
wherein the needle calibration section is provided as a dial operation section that rotate bidirectionally around a predetermined axis.

29. The onboard electronic device operating unit according to claim 1,
wherein the setup operation section includes a dial operation section capable of rotational operation around a predetermined axis,
wherein the dial operation section is provided with a cylindrical rotary operation section, and
wherein the needle-type display apparatus is mounted so as to be independent of the rotational operation on the rotary operation section.

30. The onboard electronic device operating unit according to claim 1,
wherein the needle-type display apparatus is a meter display apparatus that displays at least a vehicle speed using a needle.

* * * * *